C. THACHER.
CRANBERRY GATHERER.
No. 48,136.
Patented June 6, 1865.
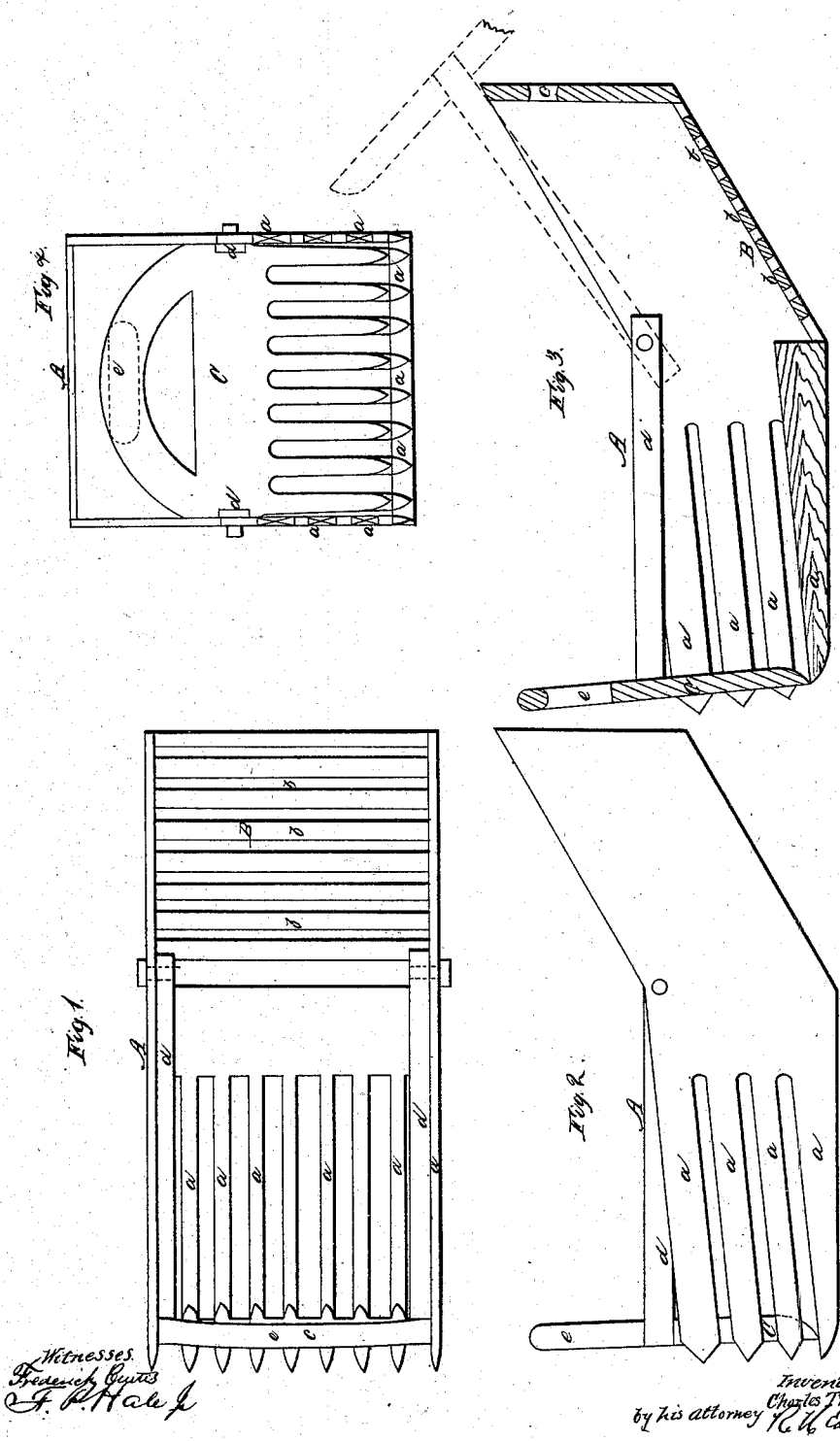

UNITED STATES PATENT OFFICE.

CHARLES THACHER, OF YARMOUTH, MASSACHUSETTS, ASSIGNOR TO HIMSELF AND GEO. SHOVE, OF SAME PLACE, AND ASSIGNED BY SAID THACHER TO LUTHER W. CLARKE, OF BOSTON, MASSACHUSETTS.

IMPROVED CRANBERRY-GATHERER.

Specification forming part of Letters Patent No. 48,136, dated June 6, 1865.

*To all whom it may concern:*

Be it known that I, CHARLES THACHER, of the town and county of Barnstable, and State of Massachusetts, have invented a new Cranberry-Gatherer; and I do hereby declare the same to be fully described in the following specification, and represented in the accompanying drawings, of which—

Figure 1 denotes a top view, Fig. 2 a side elevation, Fig. 3 a longitudinal section, and Fig. 4 a front-end view, of it.

In the said drawings, A exhibits a box-shaped receiver, whose front end is open, and whose bottom or two sides and bottom are formed with teeth $a$ $a$, arranged as represented. The rear part of the bottom is arranged at an obtuse angle with respect to the front or toothed portion of it, and a grid, grate, or sieve, B, composed of a series of parallel bars, $b$ $b$ $b$, disposed at short distances from one another. There may be an elongated aperture, $c$, made through the rear end of the receiver and near to its upper edge, and of sufficient size to enable a person to pass his hand into the said opening and grasp that part of the end which is near to it, such part serving as a handle by which the receiver may be operated by a person.

A vertical rake or comb, C, is arranged within the receiver A and at its front end, and is supported by two arms, $d$ $d$, which extend backward from it within the receiver, and are so connected to the sides of the receiver by pins or hinges as to enable the comb to be moved in the arc of a circle and either toward or away from the teeth of the bottom of the receiver, the comb being provided with a handle, $e$.

This fruit-gatherer is specially intended for the gathering of cranberries from their vines, although it is possible that it may be used in a similar manner for the gathering of other kinds of fruit. In employing it for such purpose the comb should be raised off the teeth of the bottom or be thrown back into the position indicated by the dotted lines in Fig. 3. This having been done, the receiver is to be pushed against the vines in such manner as to cause its teeth to pass between them. Afterward the comb should be moved forward into its vertical position on the bottom teeth. The whole apparatus should next be drawn backward, so as to strip the berries from the vines. By tipping the apparatus the berries may be thrown upon the grid or sieve, so as to sift from them any extraneous matters.

I claim as my invention—

1. The combination of the holding-comb C with the receiver A, provided with teeth, substantially as described.

2. The combination of the grate or sieve B, the holding-comb C, and the receiver A, provided with teeth, substantially as described.

CHS. THACHER.

Witnesses:
WM. P. DAVIS,
GEORGE OTIS.